J. A. GREEN.
GAUGE.
APPLICATION FILED AUG. 17, 1921.
1,433,076.
Patented Oct. 24, 1922.
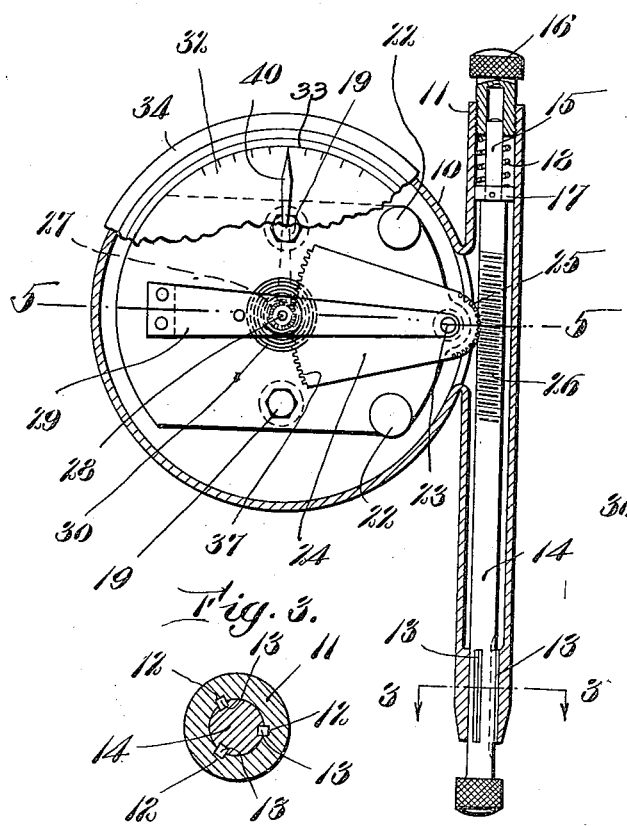
Fig. 1.
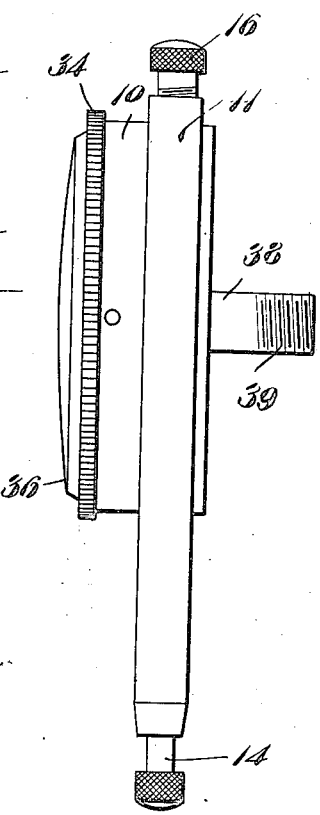
Fig. 2.
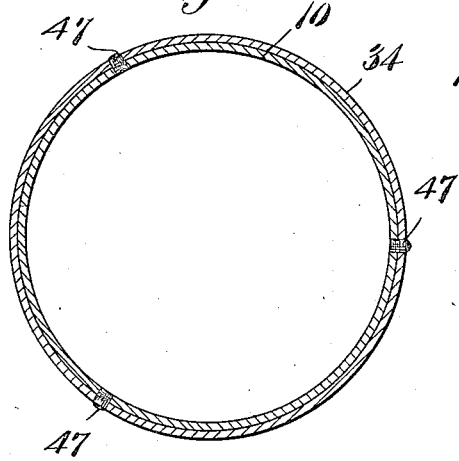
Fig. 3.
Fig. 4.
Fig. 5.
Inventor:
Joseph A. Green
by James R. Hodder
att'y.

Patented Oct. 24, 1922.

1,433,076

UNITED STATES PATENT OFFICE.

JOSEPH A. GREEN, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND.

GAUGE.

Application filed August 17, 1921. Serial No. 492,890.

*To all whom it may concern:*

Be it known that I, JOSEPH A. GREEN, a citizen of the United States, and resident of Providence, county of Providence, and State of Rhode Island, have invented an Improvement in Gauges, of which the following description, in connection with the accompanying drawings, is a specification, like reference characters on the drawings representing like parts.

My present invention relates to gauges, and more particularly to indicating gauges for measuring or indicating the amount of variation of a surface from a true plane, the amount of variation of a cylinder from a true cylinder, the amount a true plane or cylindrical surface varies from any desired plane, or the like.

In machine work, such for example, that performed in a lathe, planer, milling machine, grinder, or the like, a great deal of time is consumed in truing-up a piece of work preparatory to performing the machining operations thereon. For example, it is frequently necessary to clamp a cylinder in position on the face plate of a lathe or grinding machine preparatory to performing the finishing grinding operation thereon. It is well known that such setting-up operation must be accurately performed, and frequently requires considerable time. Various instruments have been designed to assist the operative in ascertaining the amount of error in the setting of the work, in order that the same may be corrected with certainty and quickness. Such prior instruments, however, as far as I am aware, are not entirely satisfactory, either because of their crudeness, and hence their inaccuracy, or because of their complexity and expensive construction. It has been customary in such instruments to form the segment and rod gears as a partial gear connection only, and this arrangement involving considerable wear, would eventually become loose and inaccurate through wearing. In my present invention it is an important feature to obviate this difficulty and to form one of the gear members which transmits the movement from the work to the indicating dial with means to compensate for wear. In the particular gauge construction as herein shown, I prefer to form the rod with peripheral threads or teeth running entirely around the the rod as a complete worm or gear, and then to provide the rod and the tubular casing therefor with a plurality of keyways or the like permitting different radial positions. This permits me to shift the gears when worn to a new place, and thus compensate for wear and thereby to maintain the gauge in its positive accuracy and for a relatively long life of usefulness.

I have overcome the objections above pointed out, and to this end have designed the indicator forming the subject-matter of the present invention. In my improved device, I arrange an indicating needle or hand, operated through gearing controlled by the work to be measured, and the movement of this needle or hand may be multiplied to any desired extent, over the movement of the gearing; that is, the movement of the indicating needle or hand may be once, twice, thrice, or any desired times as great as the amount of error in the setting-up of the work.

In indicating instruments, such as gauges, the indicating mechanism is ordinarily built into the gauge, and is not only insensitive, but also expensive to manufacture, easy to get out of order, and requires great skill to assemble. To remedy this defect of prior instruments, I manufacture my improved indicating mechanism as a unit, to be afterwards placed in the gauge, and am thus enabled to economically manufacture the same, and to easily and accurately adjust the mechanism and then assemble it in the gauge.

The principal object of my invention, therefore, is an improved indicator or gauge.

Another object is an improved surface gauge that is accurate, easy to adjust and assemble, and the indications of which are quickly and easily read or interpreted.

Still another object is an improved unit indicating mechanism for gauges and the like, having adjustable means to compensate for wear, thus insuring long usefulness with precision.

Other objects and novel features of the construction and arrangement of parts comprising my improved device will appear from the following description.

In the accompanying drawings illustrating the preferred embodiment of my invention, Fig. 1 is a front elevation;

Fig. 2 is a side elevation;

Fig. 3 is a section on the line 3—3 of Fig. 1;

Fig. 4 is a plan showing the method of attaching the bezel ring to the case; and Fig. 5 is a section on the line 5—5 of Fig. 1.

Referring to the drawings, 10 designates the indicator case and 11 a tubular barrel formed integral therewith, or connected thereto in any suitable manner. The lower end of the barrel 11 is provided, on the interior, with a plurality of circumferentially arranged keyways 12, in which slide a plurality of keys 13, formed integral with or attached to the indicating rod 14. The upper end of the indicating rod 14 is reduced in diameter at 15 and is a sliding fit in a tension adjusting screw 16, which screws into the upper threaded end of the barrel 11. On the reduced end 15 is secured a collar 17, while between the lower end of the adjusting screw 16 and the collar 17 is a coil spring 18, the function of which will be hereinafter described.

Secured in the case 10 by bolts 19 is an indicating mechanism or movement comprising essentially a base plate 20 and a bearing plate 21, spaced apart from and secured to each other by posts 22. Rotatably mounted in the base plate 20 and bearing plate 21 is a staff 23 to which is secured a segmental gear plate 24, at one end of which are arranged teeth 25 meshing with a circular rack 26 cut on the indicating rod 14 below the collar 17, while at the other end of the plate 24 are arranged teeth 37 meshing with a pinion 27 attached to a staff 28 mounted, one end in the base plate 20 and the other end in a bearing plate 29 riveted or otherwise secured to the plate 20. A hair spring 30, attached one end to the staff 28 and the other end to a pin 31 on the base plate 20 tends to move the staff 28, segmental gear plate 24, and therefore the indicating rod 14, back to normal position. The outer or free end of the staff 28 extends through a central opening in a dial plate 32, provided with graduations 33 of any desired character. This dial plate 32 is secured in a knurled bezel ring 34 by means of a corrugated tension spring 35. The bezel ring is provided with a crystal 36 to exclude dirt, dust, or the like from the interior of the case 10 and is secured to the case by a plurality of screws 47.

A holder 38, which may be threaded, as shown at 39, or plain and of any desired size and shape, is secured to the tubular barrel 11, and is utilized to hold the device in position for operation.

The keys 13 and keyways 12 make it impossible to rotate the rod 14, while at the same time allowing said rod to have a sliding movement in the barrel 11. The tension adjusting screw 16 is used to adjust the tension of the spring 18, this tension being sufficient to overcome the tension of the hair spring 30 and bring the needle or hand 40, secured to the staff 28, to the zero indication on the dial plate 32.

These keys 13 and keyways 12 have the further important function of enabling a partial rotation of the rod 14 to be made in the tube 11, to bring a new part or portion of the gear teeth 26 into engagement with the segmental teeth 25. Thus, in case the instrument has become inaccurate through wearing of the engaging portions of the teeth 25 and rack 26, the thumb nut 16 is loosened, the rod 14 withdrawn sufficiently to free the keys 13 from their engaging keyways, the rod 14 being then turned sufficiently to re-engage the keyways at another point, thus bringing a new and unworn portion of the rack 26 into working engagement with the segmental gear 25. This simple adjustment thus automatically corrects, trues up and reverifies the instrument, rendering it again as accurate as originally made.

The operation of the device is as follows, it being assumed that it is desired to set up a cylinder in a lathe preparatory to grinding the interior of such cylinder to the desired size. The cylinder is strapped onto the face plate of the lathe (not shown), the improved gauge fastened to the tool post of the lathe, and the free end of the rod 14 brought into engagement with the interior of the cylinder, as such cylinder is rotated. Should the cylinder not be properly centered, the rod 14 will engage the cylinder at but a single point and the amount such cylinder is out of centre will be visually indicated on the dial plate 32 by the needle or hand 40. Because of the multiplying action of the operating mechanism of the gauge, the slightest variation of the work from its central position will be readily apparent. By swinging the gauge in the tool post, so as to bring the free end of the rod 14 into engagement with the bottom face of the cylinder, the distance of such face from a vertical plane located perpendicular to the arbor of the lathe will be visually indicated on the dial plate.

The above illustrates but one of the many uses to which the present invention may be applied, and other uses for the same will readily suggest themselves to those skilled in the art. Further, while I have shown and described the preferred embodiment of my invention somewhat in detail, it is to be understood that I may vary the size, shape and arrangement of parts comprising my device within wide limits without departing from the spirit of the invention.

Having thus described my invention, what I claim as new, is:

1. An improved indicating unit for measuring and indicating instruments, comprising a base, a bearing plate attached thereto and spaced apart therefrom, a staff rotatably mounted in said base and plate, a hand and a pinion attached to the staff, a second staff rotatably mounted in said base and plate, a plate attached to said second staff, gear teeth cut in one end of said plate and meshing with said pinion, a tubular member associated with said base, an indicating rod non-rotatably and slidably mounted in said tubular member, a rack formed on said indicating rod, and gear teeth cut in the other end of said plate and meshing with the rack on the indicating rod.

2. An improved indicating device, comprising a gear, an indicating mechanism driven thereby, a circular rack meshing with said gear, means for preventing rotative movement of said rack, relative to said gear, and means permitting disengagement of said last named means whereby the rack may be rotated to present an unworn portion to the gear.

3. An improved indicating device, comprising a sliding bar, a key attached thereto near one end thereof, a holder, a keyway in said holder, said key fitting into said keyway to prevent rotative movement of the sliding bar, a gear, and a circular rack cut on said sliding bar and meshing with said gear on a line extending longitudinally of the bar, said key being of such length that it may be slid temporarily out of engagement with the keyway, whereby the sliding bar may be rotated to present an unworn portion thereof to the gear and an indicating hand associated with and operable through the medium of the indicating rod.

In testimony whereof, I have signed my name to this specification.

JOSEPH A. GREEN.